United States Patent [19]

Hemmings

[11] 4,382,609
[45] May 10, 1983

[54] INTERCHANGEABLE FIXED OR DAMPED TOWING SYSTEM

[75] Inventor: Davis L. Hemmings, Royal Oak, Mich.

[73] Assignee: The United States of America as represented by the Secretary of the Army, Washington, D.C.

[21] Appl. No.: 321,502

[22] Filed: Nov. 16, 1981

[51] Int. Cl.³ .............................................. B60D 1/02
[52] U.S. Cl. ................................ 280/415 A; 280/486; 280/495
[58] Field of Search ........... 280/415 R, 415 A, 415 B, 280/417, 486, 511, 495, 656

[56] References Cited

U.S. PATENT DOCUMENTS 2,783,039  2/1957  Wilson ................................ 280/486
3,797,850  3/1974  Stout .................................. 280/495
4,261,594  4/1981  Corbett et al. ................... 280/415 R Primary Examiner—Joseph F. Peters, Jr.
Assistant Examiner—Donn McGiehan
Attorney, Agent, or Firm—Peter A. Taucher; John E. McRae; Robert P. Gibson

[57] ABSTRACT

An A-frame trailer front end construction configured to alternately accept a non-dampered connector for co-action with the towing vehicle or a damped connector without structural modification of the A-frame. Switch over between the damped and non-damped towing modes can be accomplished very quickly by the loosening and unloosening of mounting bolts between the connector and A-frame. The system enables the human operator to select the type of connection most conducive to human driver comfort, minimum inertial loading between the towed and towing vehicle, and lessened load forces on the vehicle brakes and suspension.

2 Claims, 5 Drawing Figures

INTERCHANGEABLE FIXED OR DAMPED TOWING SYSTEM

GOVERNMENT INTEREST

The invention described herein may be manufactured, used, and licensed by or for the Government for governmental purposes without payment to me of any royalty thereon.

BACKGROUND AND SUMMARY

This invention relates to a towing system for a trailer, particularly a towing system that can be economically changed to utilize either a fixed non-damped towing mechanism or a damped towing mechanism. The term fixed non-damped denotes a rigid, nonextensible connection between the trailer and towing vehicle. The term "damped" denotes a hydraulic shock-absorber type connection between the trailer and towing vehicle.

For trailers in which the longitudinal inertia forces are relatively constant, a fixed non-damped connection between the trailer and towing vehicle is satisfactory. However, where heavy trailer loads or varying trailer inertia forces are encountered it is desirable to employ a damped connection between the trailer and towing vehicle. Varying inertia forces are commonly associated with liquid tank trailers or heavy cargo trailers, such as boxed ammunition carriers. The liquids in tank trailers can slosh or surge back and forth out of phase with trailer motion to provide objectionable intermittent pulse loadings on the towing connection. By incorporating a hydraulic shock absorber or dampener in the towing connection it is possible to absorb these pulse-type loadings in the towing connection, thus improving human driver comfort as well as increasing the structural life of the towing mechanism and other vehicle components, such as the brakes and suspension.

The present invention contemplates modifications to a convention two wheel A-frame trailer front end to enable the A-frame to receive either a fixed non-damped towing system or a damped towing system. Towing system interchangeability is especially useful in military vehicles where a given vehicle may be required to handle different types of cargo from one day to the next. Towing system interchangeability is further advantageous in such respects as lower depot inventory requirements, easier repair or maintenance operations, and capability for accommodating design improvements in towing system hardware without alterations in the trailer A-frame.

THE DRAWINGS

Figure 1:
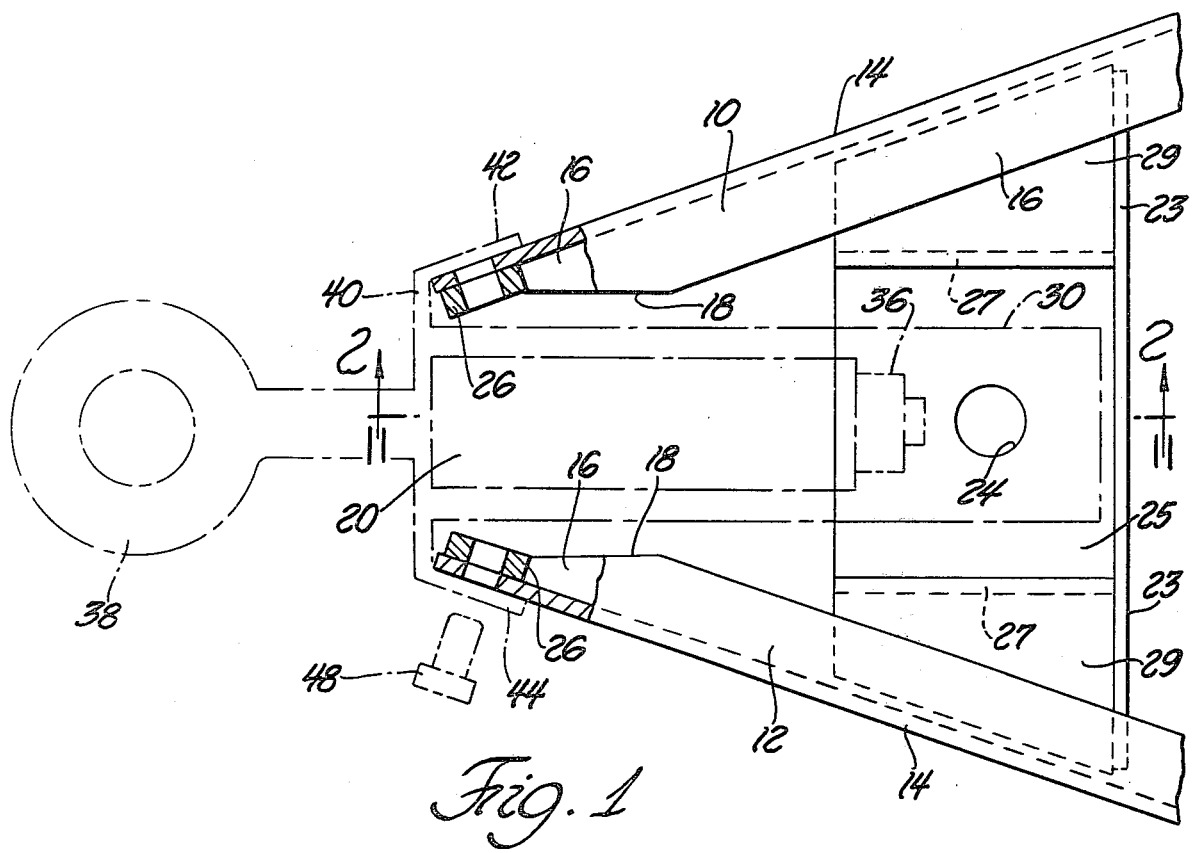
FIG. 1 is a fragmentary top plan view of a trailer front end, modified to receive either the towing mechanism of FIG. 3 or the towing mechanism of FIG. 4.

Referring in greater detail to FIG. 1, there is shown the extreme front end of an A-frame trailer, such as the two wheel military trailer designated by the U.S. Army as the M149. The A-frame comprises two forwardly convergent rails 10 and 12 of channel cross-section. Each rail includes a web wall 14 and flange walls 16. The rails are arranged in a common horizontal plane with the flange walls 16 facing inwardly, i.e., toward one another. Extreme forward ends of flange walls 16 are cut back on an angle, as at 18, to define a central open zone 20 between the rails for receiving either the towing mechanism shown in FIG. 3 or the towing mechanism shown in FIG. 4. The FIG. 3 mechanism is shown in phantom outline in FIG. 1.

The A-frame front end is spanned by a transverse bridge assembly that includes a channel element 22 and transverse vertical wall or bulkhead 23. Element 22 comprises a lower horizontal wall 25, two upstanding vertical walls 27 and two outwardly extending upper walls 29. Channel element 22 and bulkhead 23 may be welded together prior to installation of the bridge assembly into the A-frame. Walls 29 of the bridge assembly are welded to the undersides of the rail upper flanges 16 to complete the A-frame design.

Figure 2:
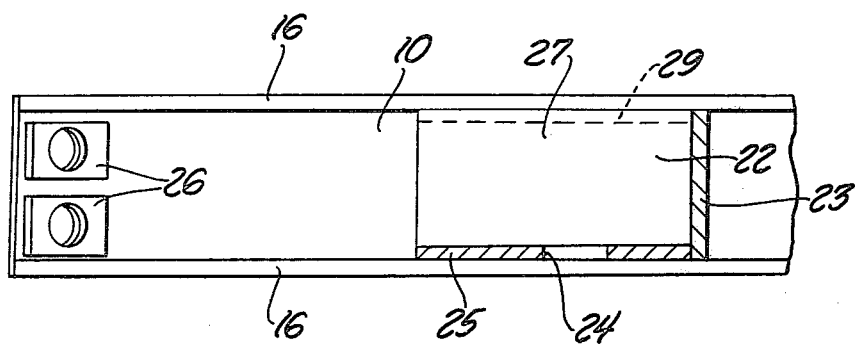
FIG. 2 is a sectional view of the trailer frame on line 2—2 in FIG. 1.

A circular opening 24 is provided in wall 25 of element 22 on the A-frame longitudinal axis to accommodate a mounting bolt 46 for the towing mechanism. By viewing both FIGS. 1 and 2 it will be seen that four nuts 26 are affixed to rails 10 and 12 near their front ends to receive mounting bolts 48. Bolts 46 and 48 are used to mount either the FIG. 3 or FIG. 4 towing mechanism on the A-frame.

Figure 3:
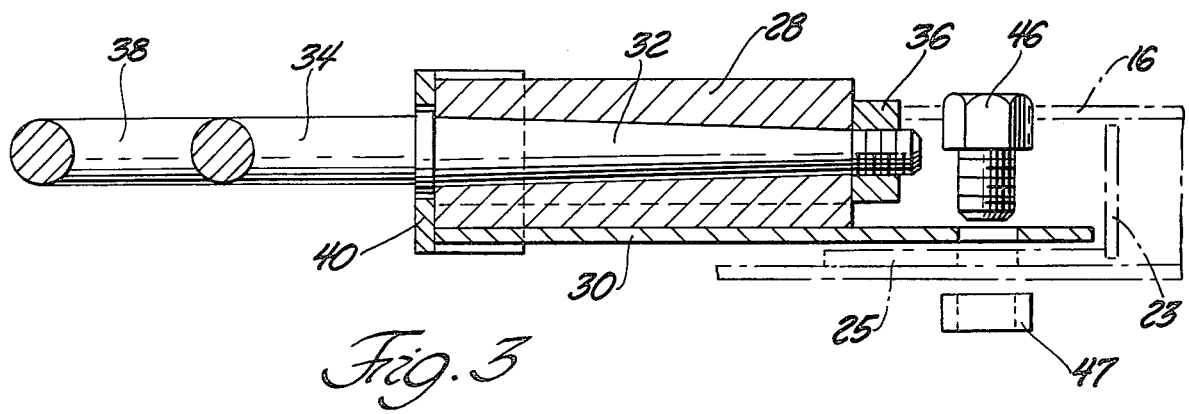
FIG. 3 is a sectional view through a non-damped towing mechanism constructed for use on the FIG. 1 trailer frame.

The towing mechanism of FIG. 3 includes a rectangular block-like housing 28 suitably secured to a horizontal base plate 30 of rectangular cross-section. Housing 28 has a longitudinal bore or socket that receives the slightly tapered section 32 of a rod 34; nut 36 locks the rod and housing firmly together as a unitary structure. The front end of the rod is configured as an eye 38 for coaction with a nonillustrated pintle carried by the truck or other towing vehicle. Housing 28 and/or base plate 30 are secured to an upright mounting plate 40 having a central plate area adapted to extend across the space between the front ends of rails 10 and 12, as depicted in FIG. 1. Plate 40 also includes end walls or flanges 42 and 44 acutely angled to the central area of the plate for facial engagement on the outer surfaces of rails 10 and 12.

The FIG. 3 towing mechanism is positionable in central zone 20 with the rear end of base plate 30 overlapping the horizontal face of bridging element 22. Bolt 46 can be extended through aligned holes in plate 30 and element 22 to mesh with nut 47 for thus anchoring plate 30 to the A-frame. Other bolts 48 can be threaded into the aforementioned nuts 26 to firmly lock the towing mechanism on the frame.

Figure 4:
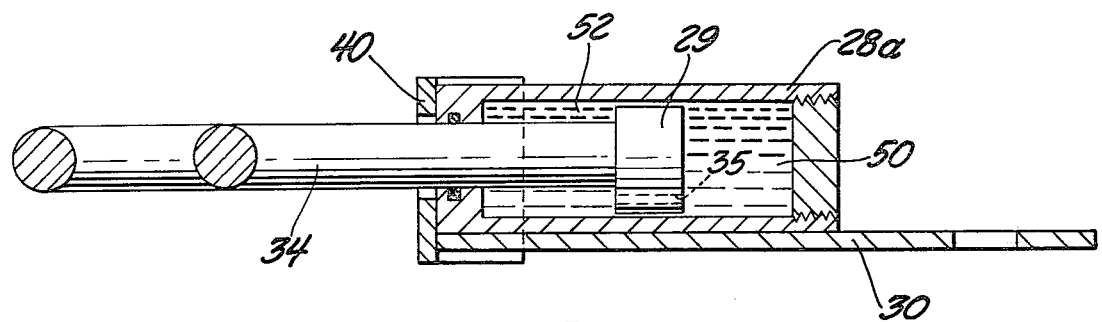
FIG. 4 is a sectional view through a damped towing mechanism installable in the FIG. 1 trailer frame as an alternate to the FIG. 3 mechanism.
Figure 5:
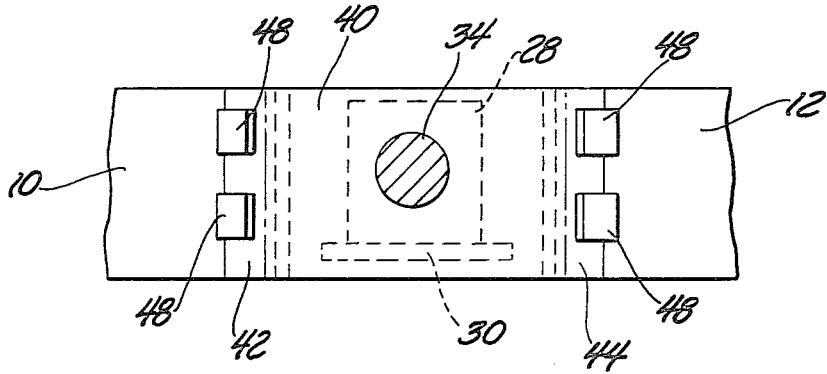
FIG. 5 is a front view of the FIG. 1 A-frame, with the FIG. 3 towing mechanism installed thereon.

The FIG. 4 damped towing mechanism uses the same base plate 30 and upright mounting plate 40 that are used in the FIG. 3 mechanism. However, the housing comprises a hydraulic cylinder 28a whose inner surface is slidably engaged by a piston 29 carried by rod 34. One or more flow orifices 35 are formed in piston 29 to provide a controlled flow of liquid across the piston from chamber 50 to chamber 52, and vice versa, depending on the direction of trailer forces being experienced.

The FIG. 4 assembly may be installed in the FIG. 1 trailer frame as an alternate to the FIG. 3 mechanism when a damped towing mechanism is desired.

I wish it to be understood that I do not desire to be limited to the exact details of construction shown and described for obvious modifications will occur to a person skilled in the art.

I claim:

1. In a trailer that comprises a horizontal A-frame at the trailer front end; said A-frame including two forwardly convergent rails of channel cross-section arranged with their flange walls extending toward one another, said rails having their front ends spaced apart to define an open zone therebetween, and a transverse bridge element connecting the rails at points rearwardly spaced from the rail ends: the improvement comprising a first non-damped towing mechanism, and a second damped towing mechanism, said mechanisms being constructed to be interchangeably bolted to the forward end of the A-frame in the aforementioned open zone; each towing mechanism including an upright mounting plate having a central plate area sized to extend transverse to the A-frame longitudinal axis at the rail front ends, said mounting plate also including end areas acutely angled to the central plate area for facial engagement with outer surface areas of the convergent rails; each towing mechanism also including a horizontal base plate arranged to extend from the aforementioned mounting plate rearwardly into overlapping relationship with the aforementioned bridge element; first bolt-nut means for securing one of the mounting plate end areas to one of the rails; second bolt-nut means for securing the other mounting plate end area to the other rail; and third bolt-nut means for securing the rear end of the base plate to the bridge element.

2. The improvement of claim 1; each towing mechanism including a housing secured to the upper face of the respective base plate immediately behind the mounting plate, and a horizontal towing rod having a rear section located within the respective housing and a front section located forwardly of the housing, and a towing eye at the front end of the respective rod; the housing in the damped towing mechanism being a hydraulic cylinder, and the associated towing rod having a piston secured thereto for horizontal reciprocatory motion in the hydraulic cylinder.

* * * * *